Jan. 17, 1956     I. L. WISSMILLER ET AL     2,731,334
VAPOR STORAGE VESSEL AND METHOD OF MAKING SAME
Filed Aug. 17, 1951     3 Sheets-Sheet 1
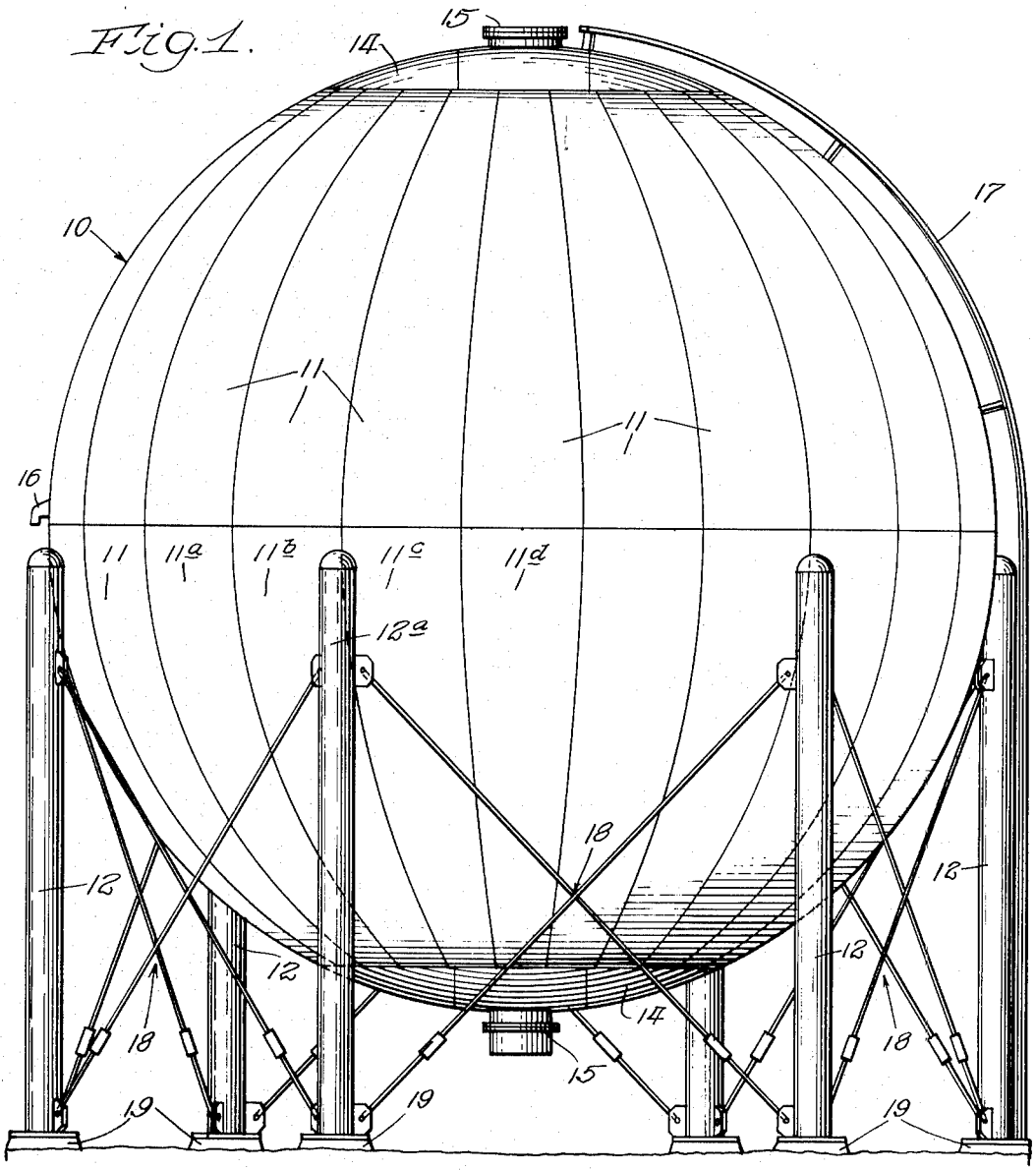
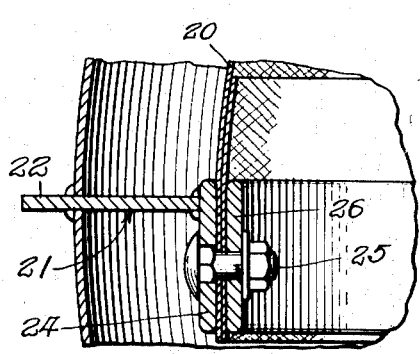

Jan. 17, 1956     I. L. WISSMILLER ET AL     2,731,334
VAPOR STORAGE VESSEL AND METHOD OF MAKING SAME
Filed Aug. 17, 1951     3 Sheets-Sheet 2
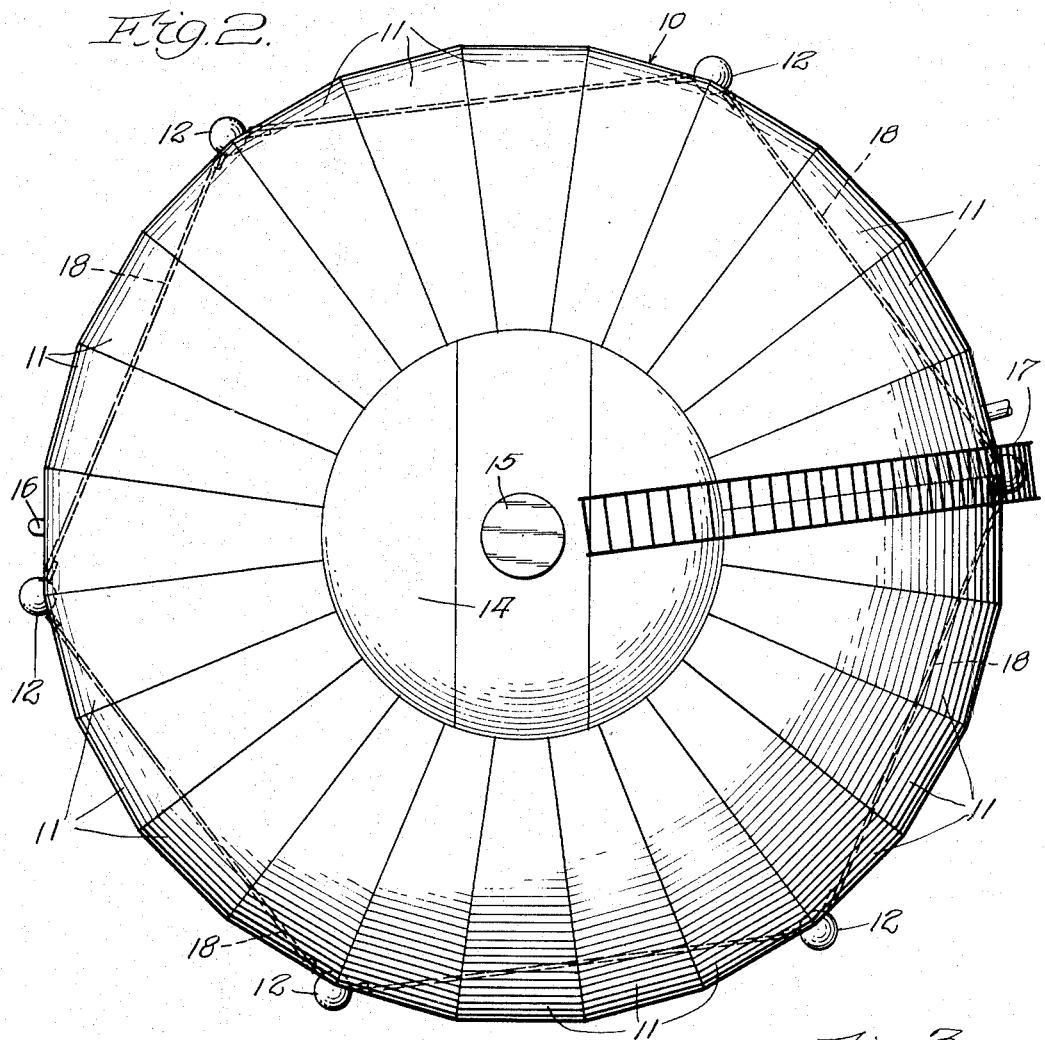
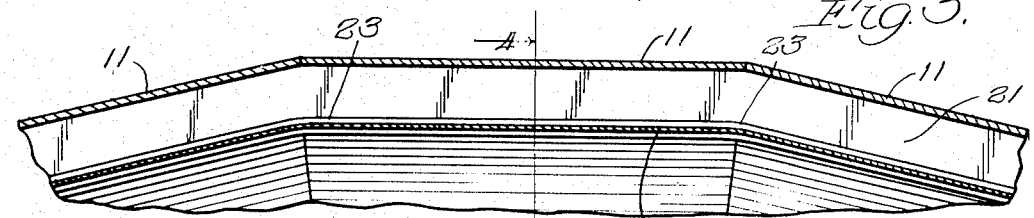
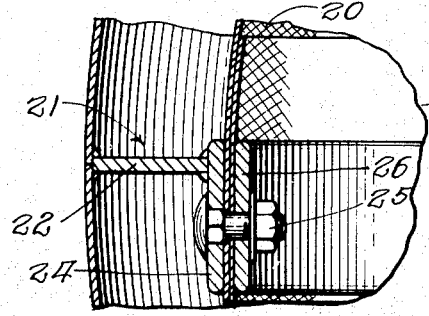
Inventors:
Ivan L. Wissmiller,
Lyle V. Larsen,
By Schroeder, Merriam,
Hofgren & Brady, Attys.

Jan. 17, 1956 I. L. WISSMILLER ET AL 2,731,334
VAPOR STORAGE VESSEL AND METHOD OF MAKING SAME
Filed Aug. 17, 1951 3 Sheets-Sheet 3
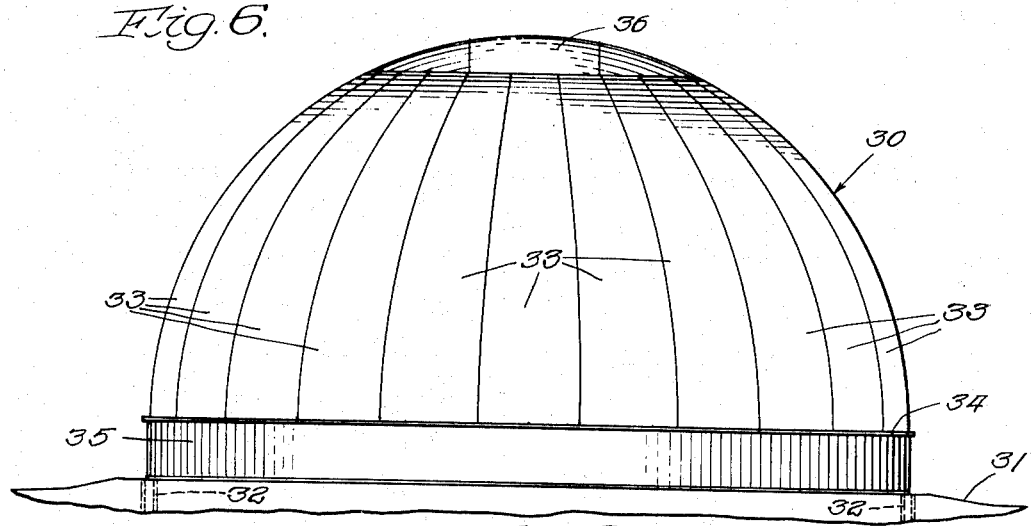
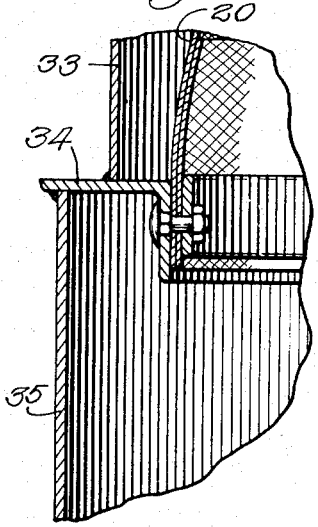
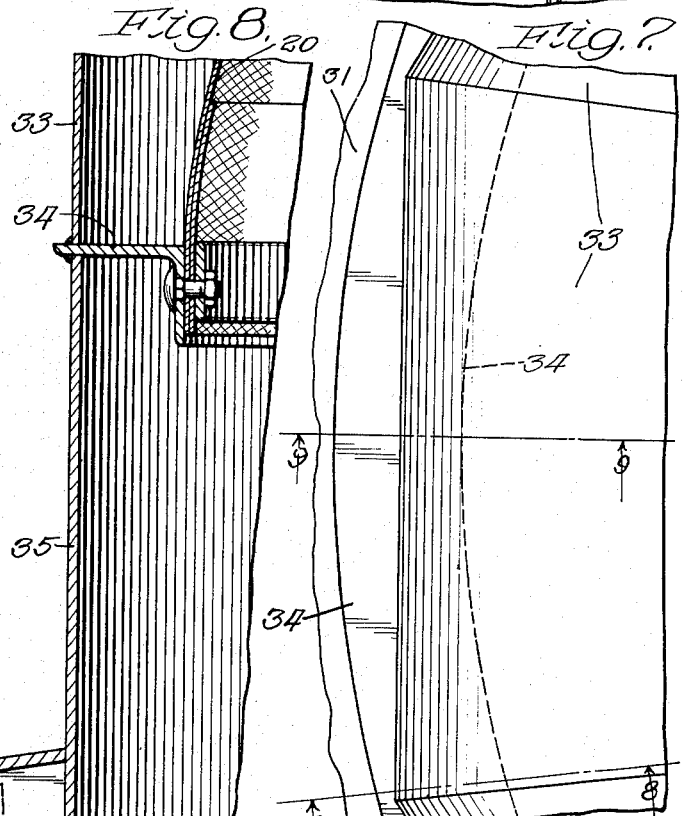
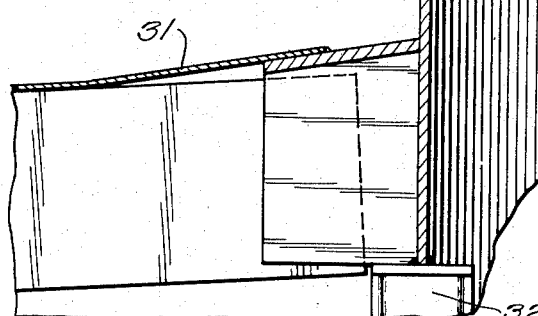
Inventors.
Ivan L. Wissmiller,
Lyle V. Larsen,
By Schroeder, Merriam,
Hofgren & Brady, Attys.

United States Patent Office 2,731,334
Patented Jan. 17, 1956

2,731,334
VAPOR STORAGE VESSEL AND METHOD OF MAKING SAME

Ivan L. Wissmiller and Lyle V. Larsen, Chicago, Ill., assignors to Chicago Bridge & Iron Company, a corporation of Illinois Application August 17, 1951, Serial No. 242,222

7 Claims. (Cl. 48—178)

This invention relates to generally spherical or partly spherical vessels for the storage of vapor and the method of constructing the same.

Gasoline and other volatile liquids are usually stored in tanks having a vapor space above the liquid surface. Vapors are lost by displacement which occurs when filling and emptying the vessels and also by breathing which results from changes in temperature. A common type of storage vessel is one with a fixed roof which cannot withstand a great deal of pressure, and therefore has usually been vented to the atmosphere permitting a substantial loss of the stored product by evaporation. Storage tanks with fixed roofs are the most economical in first cost, yet their inherent disadvantage of losing vapor has led to other types of storage tanks.

A very economical system for saving the vapors is to conduct them from the fixed roof tank to a separate vapor storage vessel which will return the vapors to the main storage tanks when the vapors therein contract or condense. Such a device may take the form of a separate spherical vessel, a cylindrical vessel with a hemispherical or hemi-ellipsoidal top or a hemispherical or hemi-ellipsoidal dome-like structure mounted on the top of an ordinary cone-roof liquid storage tank. The lower portion of the vessel is adapted to contain the vapor under a hemispherical flexible curtain which may float upwardly and downwardly on the vapor and provide a means for storing varying amounts of vapor and for returning the vapor to the liquid storage tanks under certain conditions. It is generally preferable that the upper portion of the vapor storage vessel be generally spherical, so that the hemispherical curtain or diaphragm may be backed up by this portion when the vessel is full of vapor.

This invention is concerned primarily with a very economical type of vapor storage vessel constructed in a particular way. Embodiments of the invention are illustrated in the accompanying drawings, in which:

Fig. 1 is a side elevational view of a generally spherical vessel made in accordance with the invention; Fig. 2 is a plan view of the vessel shown in Fig. 1; Fig. 3 is a fragmentary horizontal enlarged section at the equator of the vessel showing the diaphragm connection to the shell; Fig. 4 is a fragmentary section taken along line 4—4 on Fig. 3; Fig. 5 is a view like Fig. 4 of a modified form of connection; Fig. 6 is an elevational view of the upper portion of a cone-roof tank having a hemispherical vapor storage portion thereon; Fig. 7 is an enlarged fragmentary plan of the edge of the hemispherical portion and roof portion of the tank shown in Fig. 6; Fig. 8 is a sectional view taken along line 8—8 in Fig. 7; and Fig. 9 is a sectional view taken along line 9—9 in Fig. 7.

The shell of a vapor storage tank below the hemispherical curtain must be made vapor-tight and is required to withstand a maximum pressure of only two to four inches of water. The portion of the vessel above the diaphragm need only be weather-tight, and is subjected only to pressure imposed by the flexible curtain when fully inflated. The shell plates therefore may be made very thin and ordinarily may be constructed of plates 3/16 or 1/4 inch in thickness. Such plates are rather flexible and when standing alone are not of sufficient thickness to maintain their shape; however, when the same plates are combined to make up the shell of a vessel, they coact to retain whatever shape they are given.

In the construction of the tanks of this invention, the flexible plates are shaped when flat by shearing or cutting the edges thereof so as to lie between meridians of the resultant spherical shell. These plate sections when so formed may be shipped flat to the construction site where they will be assembled to form the vessel.

In the field the flat plates are placed together on the ground over forms so that they may be curved by hand and the edges welded together to form a section of the resultant spherical vessel. Securing the longitudinal edges of the plates together gives each of the plates a curvature lengthwise while at the same time the plates crosswise will remain flat. The plates are thus curved to a cylindrical surface.

Referring particularly to Figs. 1 and 2 representing a substantially spherical vapor storage vessel 10, thin flat plates 11 are welded together on the ground and a post 12 is secured to the section at the juncture of two of the plates. The post or column, which will eventually support the vessel, is secured to the section so as to extend in a general direction of the plate orientation. For example, the post or column 12a is secured to a section of plates including four adjoining plate segments 11a–11d. This section and its attached column is set in position and held there while adjacent similar sections are also erected. This procedure is repeated until a continuous course of spherical sections is erected and secured together to form one part of the vessel. In the generally spherical vessel shown, there are only two courses of shell plates. The lower course is formed in sections on the ground with a supporting column attached to each section. The upper course of shell plates is also formed in sections by bringing the edges of the flate plates together and welding along the resultant seams. These sections are then hoisted into position and secured to the formerly erected lower course.

The shell of the vessel may have from one to four courses of shell plates depending on the size of the vessel which may vary from 5000 to 150,000 cubic feet of storage capacity. The plate segments are cut to shape and shipped flat to the erection site where they are given a single plane curvature by the process of forming the sections on the ground before placing them in the vessel structure. By single plane curvature is meant a curvature forming part of a cylindrical but not necessarily right cylindrical, surface. Thus, a cross section of the curved plane taken in the plane of curvature may be shaped like a segment of an ellipse. Each plate in the vessel is curved along a cylindrical surface having a horizontal axis and generatrix.

While reference has been made to a generally spherical vessel, it will be understood that the finished product of this invention will not be exactly spherical since the shell plates are not dished and each has only a single plane of curvature, that being in a vertical plane. The completed vessel does, however, closely approach or approximate a sphere in that the design is made so that the perimeter of the polygon formed at any horizontal cross section is substantially equal to the circumference of a truly spherical vessel of the same capacity at the same cross section. In Fig. 2, the equatorial outline indicates that the vessel closely approaches a spherical shape.

Reference herein to hemispherical shell portions is not intended to limit the invention to such shape since a hemi-ellipsoidal shape may also be constructed according to the present invention. The description herein is applicable to both hemispherical and hemi-ellipsoidal shaped shell portions since a hemi-ellipsoid can be formed which is essentially the same as a hemisphere.

The addition of a head plate 14, both at the top and bottom of the vessel, completes the shell. These head plates are shown as dished and therefore truly spherical sections, however, they may take the form of conical sections, flat plates or plates given the shape of any surface of revolution. In some instances, the shell segmental plates may be extended to a point or connected at the top and bottom to a manhole, thereby dispensing with the head plates.

When finished the shell is formed of a plurality of single curvature plates, each oriented about the vertical polar axis of the shell. The vessel is supported on a number of columns each connected to the shell adjacent the equator and at the juncture of two adjoining plates. Various appurtenances are provided such as manholes 15 at the top and bottom of the shell, vents 16 near the equator connecting the upper part of the shell with the atmosphere and an access ladder 17. The columns are provided with bracing members 18 and rest on prepared foundation pedestals 19.

As mentioned earlier, a diaphragm of generally hemispherical shape is secured within the shell at substantially the equator thereof. This diaphragm 20 has substantially the same shape as one-half of the shell and is secured to an angle 21 generally circular in plan which in turn is secured to the equator of the shell. A convenient means for providing this connecting angle when the sphere has an even number of courses, and therefore a seam at the equator, is to place the horizontal leg 22 of the angle between the courses as illustrated in Fig. 5. In the case of spheres having an uneven number of courses, and therefore no seam at the equator, the angle connection to the shell may be made by welding the leg 22 to the shell, as illustrated in Fig. 4. Since the horizontal cross section of the sphere is actually a polygon, the plate to which the diaphragm is connected is provided with curved portions 23 adjacent the angle connections of the plates of the shell as illustrated in Fig. 3. This eliminates any sharp bends in the diaphragm which are undesirable from the standpoint of wear. The diaphragm is secured to the downwardly extending leg 24 by bolts 25 passing through the diaphragm and a back-up plate 26.

Some vapor storage tanks are made with a cylindrical bottom portion and a hemispherical top. In other instances a hemispherical dome-like portion is mounted on the top of a cone-roofed liquid storage tank. The hemispherical portion in each instance may be made in accordance with the procedure outlined above for a spherical vessel. There is, however, the problem of providing a connection between the hemispherical portion and the cylindrical portion of such vessels. At the connecting line or horizontal plane, the hemispherical portion has a polygonal shape while the cylindrical portion will ordinarily be circular. It is preferable to make the hemispherical portion of a sufficient number of plates so that the deviation of the center of each plate from a circle circumscribed about the polygon formed by the plates is not more than about three inches. In this manner the connection between the two portions of the vessel may be easily effected by interposing the horizontal leg of the connection angle for the diaphragm between the edges of these sections. The round portion of the vessel will thus form a circle connection to the angle at a fixed distance from the downwardly depending leg of the connecting angle and the polygonal shaped edge portion of the dome will have a polygonal connection on the top side of the horizontal leg which will vary in its distance from the downwardly depending leg. Such a connection not only provides a rigid transition piece between the hemispherical portion and cylindrical portion but also provides a connection for the hemispherical curtain.

As illustrated in Figs. 6–9, the hemispherical vapor storage vessel 30 may be secured to the cone roof 31 of a liquid storage tank and generally supported by posts 32 under the periphery of the dome. In the case of vapor storage tanks having a cylindrical lower portion, the upper hemispherical part is supported directly on the connection angle for the diaphragm which in turn is supported directly on the shell of the cylindrical lower portion.

The hemispherical dome 30 is made up of plate segments 33 each formed with edges lying along a meridian of the shell and a head plate 36. The plates are secured together in sections on the ground and hoisted into position on top of the tank in a manner similar to that described above as related to the spherical vessel. The dome 30 is set upon the horizontal leg 34 of the connection angle for the diaphragm which rests on top of a cylindrical skirt 35 in turn secured in the top 31 of the storage tank. As seen in Figs. 8 and 9, the plates 33 are directly above the skirt 35 at the corners of the polygon and are inwardly spaced therefrom in the center of the plates 33 between corners or seams. The diaphragm 20 is connected to the angle as in the case of the spherical vessel.

The foregoing detailed description has been given for clearness of understanding only, and no unnecessary limitations should be understood therefrom, for some modifications will be obvious to those skilled in the art.

We claim:

1. A vapor storage vessel having at least an upper substantially hemispherical shell portion, said shell portion being made of thin flexible plates curved to a substantially cylindrical surface having a horizontal axis and edge portions joined together, said flexible plates having their edges lying substantially along meridians of said hemispherical shell portion, a lower shell portion joined to the upper hemispherical shell portion to complete the vessel and a connecting member between said upper and lower shell portions including a substantially horizontal annular plate interposed between the adjacent edges of said portions with each portion being secured to the plate.

2. A vapor storage vessel having at least an upper substantially hemi-ellipsoidal shell portion, said shell portion being made of thin flexible plates bent in a single plane to a curvature having an elliptical cross section taken in the single plane of bending, said elliptical cross section being of substantially the same dimensions as the ellipse of revolution of the hemi-ellipsoidal shell, said bent flexible plates having their edge portions joined together, said joined edges lying substantially along meridians of said hemi-ellipsoidal shell portion, a lower shell portion joined to the upper hemi-ellipsoidal shell portion to complete the vessel and a connecting member between said upper and lower shell portions including a substantially horizontal annular plate interposed between the adjacent edges of said portions with each portion being secured to the plate.

3. A vapor storage vessel having at least an upper substantially hemi-ellipsoidal shell portion arranged about a vertical axis, said shell portion being made of thin flexible plates each of a size incapable of retaining its shape without support, each plate being bent in a single plane to a curvature having an elliptical cross section taken in the single plane of bending, said elliptical cross section being of substantially the same dimensions as the ellipse of revolution of the ellipsoidal shell, said bent plates being edge-joined to each other along lines lying on meridians of the shell portion passing through its pole, said plates being joined together to hold the individual plates in said elliptical shape and said upper shell portion from collapse, said upper portion being joined to a round shell portion having a circumference substantially equal to the perimeter of the hemi-ellipsoidal portion at the juncture, and having a substantially horizontal annular plate interposed between the adjoining edges of the upper and lower shell portions with each portion being secured to the plate.

4. A vapor storage vessel having at least an upper substantially hemi-ellipsoidal shell portion arranged about a vertical axis, said shell portion having a head plate at its pole with the remainder being formed of thin flexible plates, said plates being oriented with their long dimension extending generally upright and being bent in a single plane to a curvature having an elliptical cross section taken in the single plane of bending, said elliptical cross section being of substantially the same dimensions as the ellipse of revolution of the ellipsoidal shell, adjacent pairs of plates being edge-joined with said edges lying along meridians of the shell passing through the pole thereof whereby a horizontal section of the shell below the head plate is a polygon, said plates being joined together to hold the individual plates in said elliptical shape and said upper shell portion from collapse, said upper portion being joined to a lower portion, having a substantially circular plate interposed between the adjoining edges of the upper and lower shell portions with each portion secured to the plate.

5. A vapor storage vessel as specified in claim 4 in which said circular plate is substantially horizontal and has a flange projecting vertically from the inner edge thereof to provide means for securing a diaphragm thereto.

6. The method of constructing a horizontal course of a generally ellipsoidal shell of a vapor storage vessel comprising cutting thin flat plates into a flat shape which when bent in a single plane to a curvature having an elliptical cross section forms a vertically elongated segment of the course, bending said shaped flat plates in a single plane to a curvature having an elliptical cross section taken in the single plane of bending, securing the longitudinal edges of at least two such plate segments to form a vertically elongated section of said vessel whereby the joined plates form a section of the ellipsoidally shaped shell and then securing a plurality of the so formed sections together at their longitudinal edges with the plates oriented generally upright to form the said course of an ellipsoidal shell.

7. The method of constructing a generally ellipsoidally shaped vapor storage vessel comprising cutting thin flat plates into a flat shape which when bent in a single plane to a curvature having an elliptical cross section forms a segment extending between meridians of the vessel, bending said shaped flat plates in a single plane to a curvature having an elliptical cross section taken in the single plane of bending, securing the longitudinal edges of at least two such plate segments to form a vertically elongated section of said vessel, securing a column to the section at the juncture of two adjacent plates of the section so that the column extends generally in the longitudinal direction of the adjoining plates, supporting the section in elevated position on the column and then securing a plurality of said sections together to form a latitudinal course of shell plates having a polygonal horizontal cross section and securing additional latitudinal courses to the first to complete the shell.

References Cited in the file of this patent

UNITED STATES PATENTS

| | | |
|---|---|---|
| 1,621,984 | Horton | Mar. 22, 1927 |
| 1,666,666 | Pew, Jr. | Apr. 17, 1928 |
| 1,726,281 | Wilson et al. | Aug. 27, 1929 |
| 2,269,568 | Wilkin | Jan. 13, 1942 |
| 2,363,992 | Reiser | Nov. 28, 1944 |
| 2,371,632 | Lippincott | Mar. 20, 1945 |
| 2,427,676 | Horton | Sept. 23, 1947 |
| 2,579,646 | Branson | Dec. 25, 1951 |

FOREIGN PATENTS

| | | |
|---|---|---|
| 849,898 | France | Aug. 28, 1939 |